(12) United States Patent
Kovsh et al.

(10) Patent No.: US 12,063,064 B2
(45) Date of Patent: *Aug. 13, 2024

(54) LASER DIODE HEALTH MONITORING

(71) Applicant: Arista Networks, Inc., Santa Clara, CA (US)

(72) Inventors: Alexey Kovsh, Saratoga, CA (US); David Towne, San Carlos, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,327

(22) Filed: Mar. 16, 2023

(65) Prior Publication Data

US 2023/0224031 A1 Jul. 13, 2023

Related U.S. Application Data

(63) Continuation of application No. 16/892,706, filed on Jun. 4, 2020, now Pat. No. 11,632,170.

(51) Int. Cl.
*H04B 10/079* (2013.01)
*H04B 10/03* (2013.01)
*H04B 10/032* (2013.01)
*H04B 10/40* (2013.01)

(52) U.S. Cl.
CPC ........... *H04B 10/03* (2013.01); *H04B 10/032* (2013.01); *H04B 10/07955* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 6,396,611 B1* | 5/2002 | Distefano | ............. | H04B 10/25 398/164 |
| 6,661,817 B1* | 12/2003 | Ames | .................... | H01S 5/0683 372/29.021 |
| 6,792,020 B2* | 9/2004 | Romm | ................ | H01S 5/06825 372/38.07 |
| 7,146,292 B2* | 12/2006 | Rossi | ................. | G01R 31/2846 702/183 |
| 7,185,815 B2* | 3/2007 | Sanchez-Olea | ...... | G01R 31/002 235/454 |
| 7,881,608 B2* | 2/2011 | Miller | .................... | H04B 10/40 398/31 |
| 7,881,615 B2* | 2/2011 | Mei | ........................ | H04B 17/23 398/24 |

(Continued)

OTHER PUBLICATIONS

Sackinger, Eduard, Lecture Notes on: Broadband Circuits for Optical Fiber Communication, 2002 (Year: 2002).*

(Continued)

*Primary Examiner* — Jai M Lee
(74) *Attorney, Agent, or Firm* — Treyz Law Group, P.C.; Tianyi He

(57) ABSTRACT

A method for managing optical transceivers includes obtaining laser measurements for a laser operating in an optical transceiver in a network device, obtaining a failure profile for the laser, making a first determination that the laser measurements match the failure profile, and based on the first determination, initiating a remediation action for the optical transceiver.

20 Claims, 7 Drawing Sheets

(56) References Cited

U.S. PATENT DOCUMENTS

| | | | |
|---|---|---|---|
| 8,913,639 B2 * | 12/2014 | Gao | H01S 3/0014 |
| | | | 372/38.07 |
| 9,577,759 B2 * | 2/2017 | Aronson | H04B 10/0799 |
| 9,837,791 B1 * | 12/2017 | Brown | H01S 5/06837 |
| 10,128,943 B2 * | 11/2018 | Abidi | H04B 10/075 |
| 10,291,324 B2 * | 5/2019 | Aronson | H04B 10/0799 |
| 10,608,397 B2 * | 3/2020 | Nelson | H01S 3/1312 |
| 10,651,932 B2 * | 5/2020 | Shrikhande | H04J 14/0232 |
| 11,212,001 B1 * | 12/2021 | Catalano | H04B 10/564 |
| 2007/0201867 A1 * | 8/2007 | DeLew | H04B 10/077 |
| | | | 398/38 |
| 2009/0028551 A1 | 1/2009 | Mei | |
| 2018/0294876 A1 | 10/2018 | Abidi | |
| 2019/0033698 A1 | 1/2019 | Xu | |
| 2019/0213479 A1 * | 7/2019 | Takigawa | G06N 5/00 |

OTHER PUBLICATIONS

Abhijit Chakravarty et al., Characterizing Large-Scale Production Reliability for 100G Optical Interconnect in Facebook Data Centers, Frontiers in Optics / Laser Science (FiO/LS), Sep. 2017, Facebook Inc., Menlo Park, CA, United States.

QSFP-40G Universal Transceiver White Paper, Arista Networks, Inc., 2016 (6 pages).

* cited by examiner

LASER DIODE HEALTH MONITORING

This application is a continuation of U.S. patent application Ser. No. 16/892,706, filed on Jun. 4, 2020, which is hereby incorporated by reference herein in its entirety.

BACKGROUND

Network devices often utilize optical transceivers when transferring data. The optical transceivers may include lasers equipped to perform the data transfers. The lasers may, over time, experience degradation, loss of power or voltage, and/or failure of other sorts, that may impact the data transfer operation of the network devices.

SUMMARY

In general, in one aspect, the invention relates to a method for managing optical transceivers. The method includes obtaining laser measurements for a laser operating in an optical transceiver in a network device, obtaining a failure profile for the laser, making a first determination that the laser measurements match the failure profile, and based on the first determination, initiating a remediation action for the optical transceiver.

In general, in one aspect, the invention relates to a non-transitory computer readable medium in accordance with one or more embodiments of the invention includes computer readable program code, which when executed by a computer processor enables the computer processor to perform a method for managing optical transceivers. The method includes obtaining laser measurements for a laser operating in an optical transceiver in a network device, obtaining, based on an optical transceiver type, a failure profile for the laser, making a first determination that the laser measurements match the failure profile, and based on the first determination, initiating a remediation action for the optical transceiver.

In general, in one aspect, the invention relates to a system that includes a processor and memory that includes instructions which, when executed by the processor, perform a method. The method includes obtaining laser measurements for a laser operating in an optical transceiver in a network device, wherein the laser measurements are direct laser measurements or indirect laser measurements, obtaining a failure profile for the optical transceiver, making a first determination that the laser measurements match the failure profile, and based on the first determination, initiating a remediation action for the optical transceiver.

DETAILED DESCRIPTION

In general, the invention relates to a system and method for monitoring the behavior of lasers in the optical transceivers to preemptively (and proactively) notify an administrator of a potential future failure of an optical transceiver. Embodiments described herein may include generating (or obtaining) failure profiles of the laser's operation over time, where the failure profiles may be generated on a per-optical transceiver model-basis. The failure profiles may include a pattern, e.g., expressed as a function of the photocurrent under certain reversed voltage over time measured using a photodiode in the optical transceiver. The pattern may be used to predict when the optical transceiver may fail. Said another way, if the optical transceiver is behaving in a manner that matches (or is substantially similar to) the pattern, then there is a high likelihood that the optical transceiver will fail. In the event that the optical transceiver is predicted to fail, a remediation action may be performed. An example of a remediation action may be to send a notification of the potential failure to an administrator managing the network switch.

In one or more embodiments, the operation of the optical transceivers in a network switch may be measured using photodiodes embedded within the optical transceivers. The laser measurements (also referred to as measurements) (which may be represented as power, current, or voltage measurements) obtained by the photodiodes, which are periodically taken, are transmitted to a cloud service. The laser measurements may be obtained in real-time or near real-time using a digital diagnostic monitoring (DMM) function, which may be embedded in the optical transceiver. The cloud service may store the measurements from optical transceivers from all network switches that are subscribed to the cloud service. The cloud service may then use the measurements to predict whether a given optical transceiver is likely to fail. The prediction may be based on: (i) a failure profile associated with the optical transceiver (and/or type of laser(s) embedded therein) and (ii) the measurements obtained from the network switch. The failure profiles may be originally obtained from optical transceiver and/or laser manufactures; however, the failure profiles may be updated overtime based on the measurements obtained from the network switches. The updating of the failure profiles may be performed using machine learning techniques (or other artificial intelligence techniques) in order to improve the accuracy of the failure profiles in predicting a potential failure of the laser used in the optical transceivers.

Figure 1:
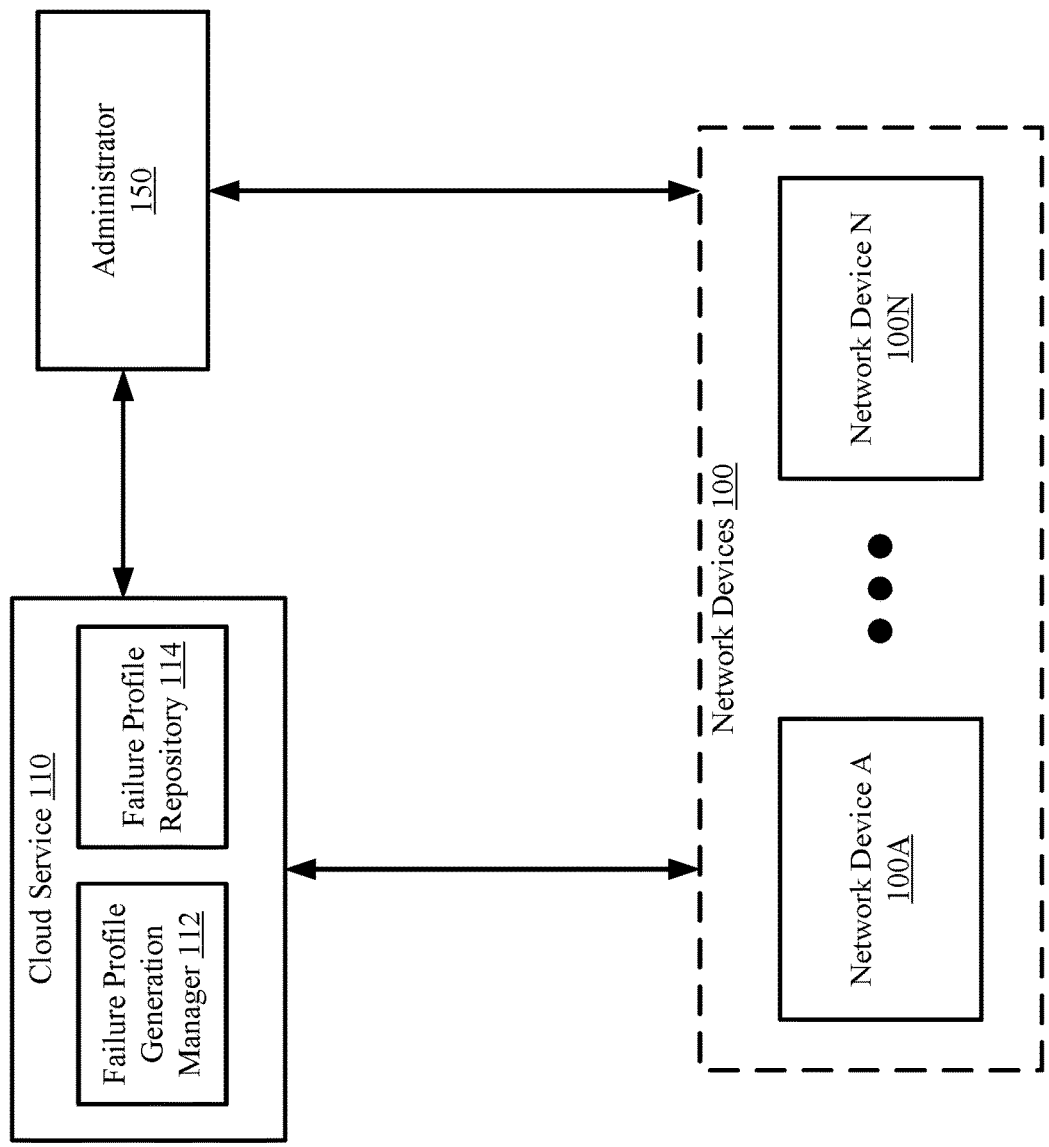
FIG. 1 shows a system in accordance with one or more embodiments described herein.

FIG. 1 shows a system in accordance with one or more embodiments described herein. As shown in FIG. 1, the system includes one or more network devices (100), cloud service (110), and administrator (150). Each of these components is operatively connected via any combination of wired and/or wireless connections without departing from the invention. The system may include additional, fewer, and/or different components without departing from the invention. Each of the aforementioned components illustrated in FIG. 1 is described below.

In one or more embodiments, each network device (e.g., network device 100A, network device 110N) is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device include, but are not limited to, a network switch, a router, a multilayer switch, a fibre channel device, an InfiniBand® device, etc. A network device (100) is not limited to the aforementioned specific examples.

In one or more embodiments, each of the network devices (e.g., network device 100A, network device 100N) includes functionality to receive network traffic data units (e.g., frames, packets, tunneling protocol frames, etc.) at any of the physical network interfaces (e.g., ports) of the network device and to process the network traffic data units. In one or more embodiments, the network device utilizes optical transceivers (discussed in FIG. 2) that transmit data between network devices (100) and/or between components in a network device (100A, 100N). The process of receiving network traffic data units, processing the network traffic data units, and transmitting the network traffic data units may be in accordance with, at least in part, instructions issued by administrator (150).

In one or more embodiments, an optical transceiver utilizes lasers (not shown in FIG. 1) to transmit such data. The behavior of the lasers may be measured by components of the network device (e.g., 100A, 100N). The laser measurements (e.g., measurements of the performance of the lasers) may be transmitted to cloud service (110).

In one or more embodiments, a network device (e.g., network device 100A, network device 100N) also includes and/or is operatively connected to device storage and/or device memory (i.e., non-transitory computer readable mediums) storing software and/or firmware.

Such software and/or firmware may include instructions which, when executed by the one or more processors (not shown) of a network device, cause the one or more processors to perform operations in accordance with one or more embodiments described herein.

The software instructions may be in the form of computer readable program code to perform methods of embodiments as described herein, and may be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium. For additional details regarding network devices (100A, 100N), see, e.g., FIG. 2.

In one or more embodiments, the network device is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet. In one or more embodiments, a network includes a collection of one or more network devices (e.g., 100) that facilitate network connectivity for one or more operatively connected devices (e.g., computing devices, data storage devices, other network devices, etc.) (not shown). In one or more embodiments, network device (100) and other devices within the network are arranged in a network topology (not shown). In one or more embodiments, a network topology is an arrangement of various devices of a network.

In one or more embodiments, cloud service (110) includes functionality for monitoring network devices (100) and for initiating remediation actions when cloud service (110) determines that a network device (e.g., 100A, 100N) is to be remediated based on the monitoring. In one or more embodiments, cloud service (110) includes failure profile generation manager (112) and failure profile repository (114). Cloud service (110) may include additional, fewer, and/or different components.

Figure 5:
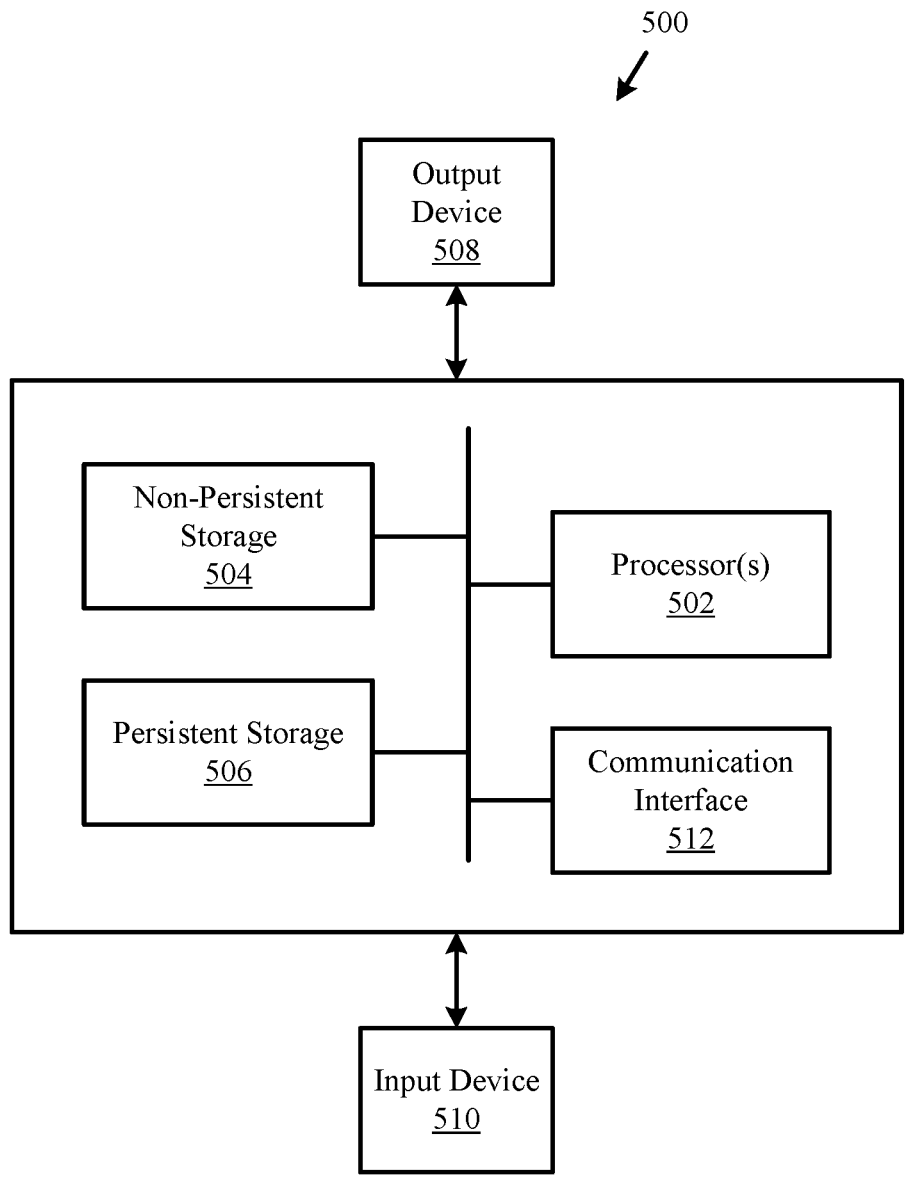
FIG. 5 shows a diagram of a computing device in accordance with one or more embodiments described herein.

In one or more embodiments, cloud service (110) is implemented as a computing device (see, e.g., FIG. 5). The computing device may be, for example, desktop computer, server, or computing resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of cloud service (110) described throughout this application.

In one or more embodiments, cloud service (110) is implemented as a logical device. The logical device may utilize computing resources of any number of physical computing devices to provide the functionality of cloud service (110) described throughout this application.

In one or more embodiments, the failure profile generation manager (112) generates failure profiles. In one or more embodiments, a failure profile is a pattern of measurements taken for a component of a network device (e.g., an optical transceiver) that the component is likely to follow if the component has failed or is predicted to fail in the near future. The failure profiles may be generated by applying a machine learning algorithm to the laser measurements. In one or more embodiments, the failure profile may be represented as, for example, a function of voltage over time, a function of power over time, or a function of current over time. The failure profile may be represented via any other mechanism without departing from the invention. Further, the function may be of any variables without departing from the invention.

In one or more embodiments, the failure profiles are generated based on laser measurements obtained from network devices (100). The failure profile generation manager (112) may generate the failure profile by implementing a machine learning algorithm on the laser measurements.

In one embodiment of the invention, the failure profiles may be generated on a per-laser type basis or a per-optical transceiver type basis. The identification of an appropriate failure profile, see e.g., FIGS. 3A-3B, may be determined using either the laser type or the optical transceiver type depending on how the failure profiles are generated (i.e., on a per-laser type basis or a per-optical transceiver type basis).

In one or more embodiments of the invention, a machine learning algorithm is a series of one or more functions that specifies relationships between any number of inputs and outputs. Examples of machine learning algorithms include, but are not limited to: Linear Regression, Multi-Linear Regression, Logistic Regression, Decision Tree, SVM, Naive Bayes, kNN, K-Means, Random Forest, Dimensionality Reduction Algorithms, and Gradient Boosting algorithms.

In the context of the failure profile, the inputs may be laser measurements of, for example, voltage, power, and/or current over time for components that have failed or were close to failing during the time period(s) associated with the laser measurements. The output may be the failure profile.

In one or more embodiments, failure profile generation manager (112) is implemented as computing code stored on a persistent storage that when executed by a processor of cloud service (110) performs the functionality of the failure profile generation manager (112). The processor may be a hardware processor including circuitry such as, for example, a central processing unit or a microcontroller. The processor may be other types of hardware devices for processing digital information without departing from the invention.

In one or more embodiments of the invention, failure profile repository (114) stores failure profiles. The failure profiles may specify an optical transceiver type. In other words, each failure profile may be associated with an optical transceiver type. For additional details regarding an optical transceiver type, see, e.g., FIG. 2.

In one or more embodiments, failure profile repository (114) is implemented using devices of cloud service (110) that provide data storage services (e.g., storing data and providing copies of previously stored data). The devices that provide data storage services may include hardware devices and/or logical devices. For example, failure profile repository (114) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

In one or more embodiments, administrator (150) manages the operation of network devices (100). Administrator (150) may manage the operation of network devices (100) by obtaining notifications from cloud service (110), or other entities, that specify a potential future failure of a component in a network device (e.g., 100A, 100N). Administrator (150) may include functionality to, e.g., display the notification to a user of administrator (150).

In one or more embodiments of the invention, administrator (150) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of administrator (150) described throughout this application.

In one or more embodiments of the invention, administrator (150) is implemented as a logical device. The logical device may utilize computing resources of any number of physical computing devices to provide the functionality of administrator (150) described throughout this application.

While FIG. 1 shows a configuration of components, other configurations may be used without departing from the scope of embodiments described herein. For example, there may be any number of network devices. As another example, there may be any number of cloud services. As another example, there may be any number of network device components.

Figure 2:
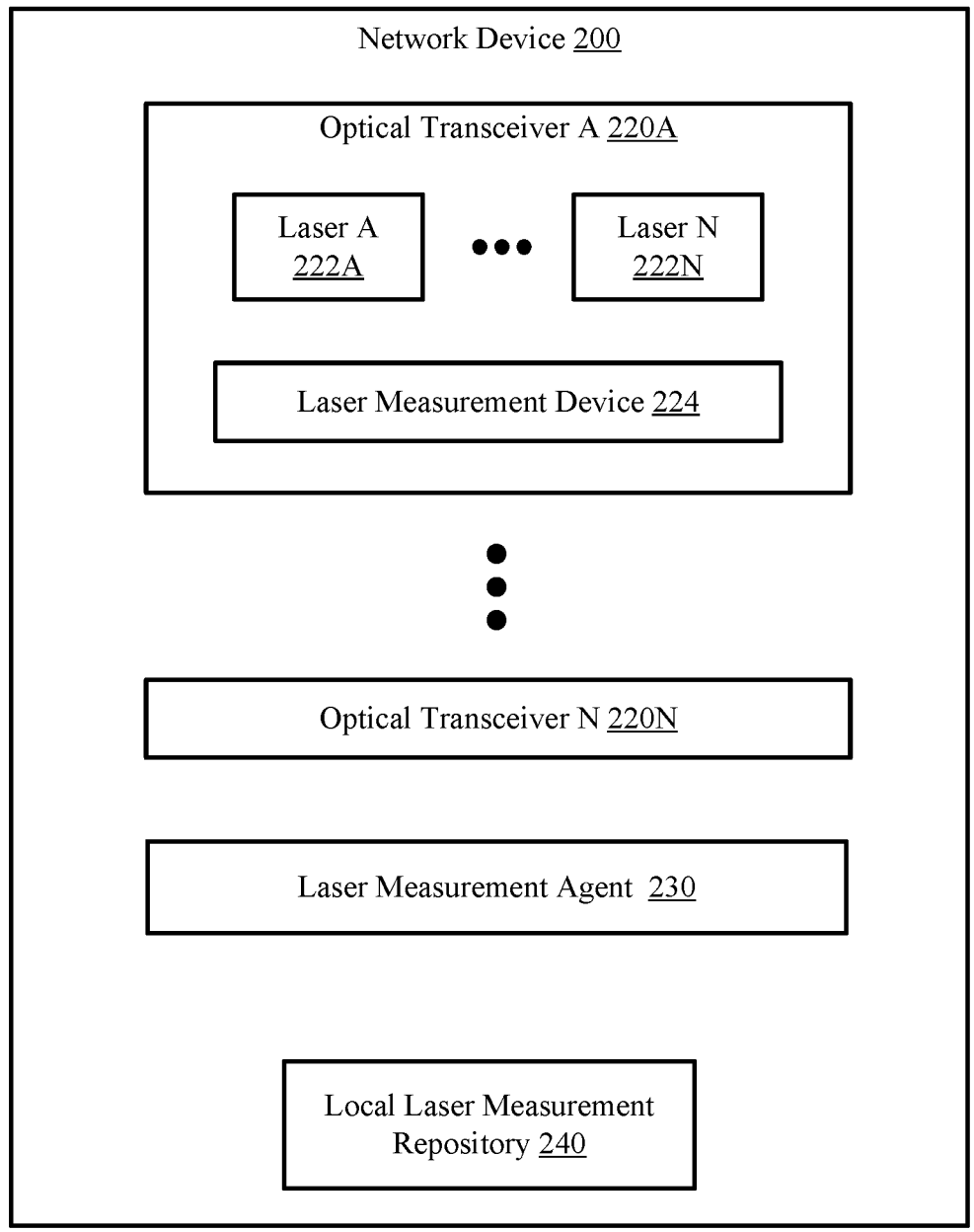
FIG. 2 shows a diagram of a network device in accordance with one or more embodiments disclosed herein.

FIG. 2 shows a diagram of a network device in accordance with one or more embodiments. Network device (200) may be an embodiment of a network device (e.g., network device 100A, network device 100N) discussed above in FIG. 1. Network device (200) may include one or more optical transceivers (e.g., optical transceiver 220A, optical transceiver 220N), laser measurement agent (230), and local laser measurement repository (240). Network device (200) may include additional, fewer, and/or different components without departing from the invention. Each of the components of network device (200) illustrated in FIG. 2 is discussed below.

In one or more embodiments, an optical transceiver (e.g., 220A, 220N) is a device with functionality for transferring data between network devices. An optical transceiver (e.g., 220A, 220N) may include, for example, one or more lasers (222) that perform the operation of transmitting and/or receiving data. The lasers (e.g., laser 222A and laser 222N) include functionality for obtaining data from one or more network devices and/or for transmitting the data to one or more network devices.

In one or more embodiments, the data is transmitted and/or obtained using light energy. Lasers (222A, 222N) include functionality for converting the data from electrical energy to light energy and transmitting the data between network devices to be obtained by the lasers of the network devices in the form of light energy.

To perform the aforementioned functionality, lasers (222A, 222N) may operate under a particular range of voltages. The range of voltages under which lasers (222A, 222N) operate may be based on an optical transceiver type of optical transceiver (220A), and/or a type of network device (200). For example, optical transceiver (220A) may be of a type that utilizes lasers that operate under a voltage range of 1.0 Volts (V) to 2V. As an additional example, optical transceiver (220N) may be of a type that utilizes lasers that operate under a voltage range of 4V to 5V. The invention is not limited to the aforementioned examples, In one or more embodiments, the type of optical transceiver used for network device (200) may be classified based on the performance (e.g., an amount of data transfer being performed by the optical transceiver over a given period of time, an intended distance in which the data is to travel, a bandwidth of the optical transceiver, etc.) of the optical transceiver, based on the number of lasers in the optical transceiver, and/or based on any other factor(s) without departing from the invention.

In one or more embodiments, the optical transceiver types may be classified based on the functionalities of the components operating in the optical transceiver. For example, a first optical transceiver type may be associated with optical transceivers that utilize one laser for receiving data and a second laser for transmitting data. A second optical transceiver type may be associated with optical transceivers that utilize one laser for both receiving and transmitting data. Because of the varying functionalities of each laser associated with different optical transceiver types, the failure profile of each optical transceiver type may vary.

To further describe the optical transceiver types, as a third example, an optical transceiver of one type may be equipped with a power control loop. The optical transceiver type of an optical transceiver may be further defined based on whether the optical transceiver is equipped with such power control loop.

In one or more embodiments, a power control loop is a component of an optical transceiver that manages the power output of the laser. The power control loop includes a monitoring photodiode and a secondary power source (e.g., a power source separate from that of the network device). The power control loop may detect a low power output of the transmitting laser and increase the current output of the laser in response to the detection to maintain a stable power output. The result of the increase current output may be an increase in power consumption of the optical transceiver. In such embodiments in which the optical transceiver is equipped with a power control loop, the laser measurements may include additional measurements about the power consumption of the laser to be used to determine if the laser is close to a point of failure.

In one or more embodiments, each optical transceiver (e.g., 220A, 220N) further includes a laser measurement device (224). The laser measurement device (224) may be equipped to capture laser measurements of the lasers (e.g., laser 222A and laser 222N) in the optical transceiver and/or laser measurements of optical transceivers of other network devices. Each laser measurement device (e.g., 224) may be further equipped to store the laser measurements in local laser measurement repository (240) of network device (200). Laser measurement device (224) may capture the laser measurements by measuring the amount of light energy emitting from the lasers (e.g., 222A, 222N) and converting the light energy into a measurable variable (e.g., a voltage, a power, and/or a current).

In one or more embodiments, the laser measurement device (224) is implemented, at least in part, as a monitoring photodiode. The monitoring photodiode may include functionality for producing a photocurrent based on the light energy emitted by a laser (e.g., 222A, 222N) within the transmitter portion of the transceiver and storing the voltage reading in local laser measurement repository (240). In such embodiments, optical transceiver (220A) includes additional photodiodes (not shown) that serve the functionality of receiving data from other network devices. The measurement obtained by the monitoring photodiode may be referred to a direct laser measurements.

There may be other transceivers that do not include monitoring photodiodes. In such embodiments, the laser measurements for the lasers within a given transceiver are obtained indirectly and, as such, these laser measurements are referred to as indirect laser measurements. More specifically, in one or more embodiments of the invention, laser measurement device (224) of optical transceiver (220A) is a photodiode in the receiver portion of the transceiver that receives data (in the form of light) from laser in a transmitter portion of a second network device. The photodiode monitors the laser power (based on the received light) of the laser in the second network device and the records these laser measurements in local laser measurement repository (240).

In one or more embodiments, network device (200) further includes laser measurement agent (230). Laser measurement agent (230) may include functionality for transferring the laser measurements in local laser measurement repository (240). In one or more embodiments, laser measurement agent (230) obtains the laser measurements stored in local laser measurement repository (240) and transfers the laser measurements to a cloud service (or other external entity) that is equipped to analyze the laser measurements in accordance with the methods of FIGS. 3A and/or 3B.

Figure 3A:
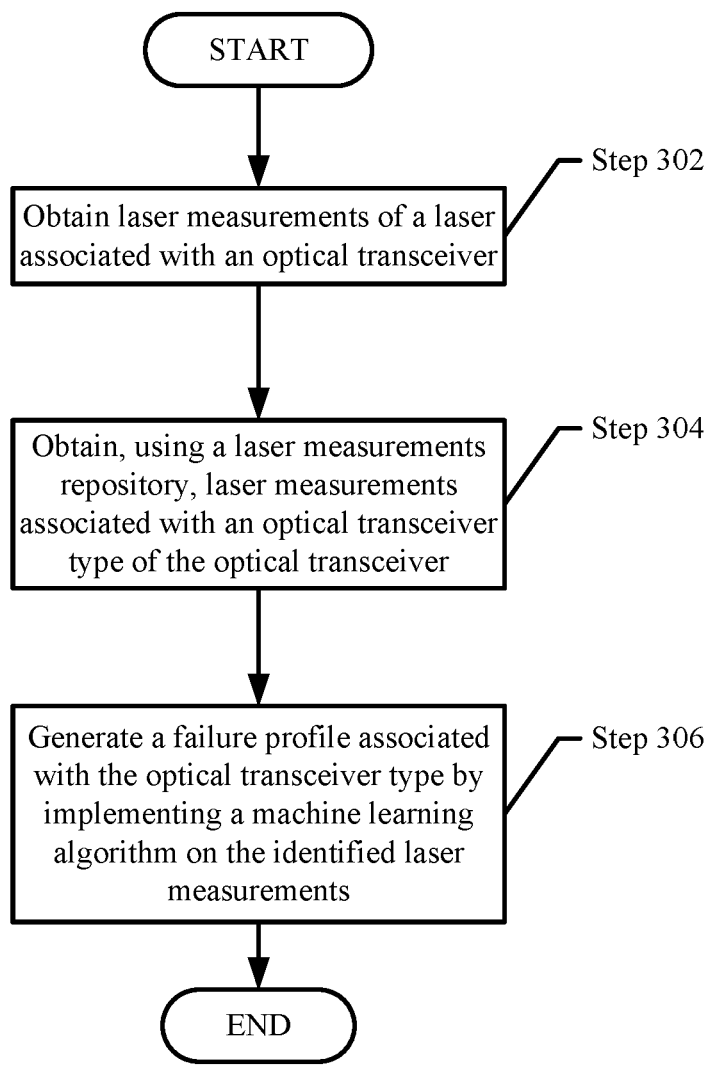
FIG. 3A shows a flowchart describing a method for generating a failure profile using laser measurements in accordance with one or more embodiments described herein.

In one or more embodiments, the laser measurements are analyzed locally in accordance with the methods of FIG. 3A. In such embodiments, the laser measurement agent (230) is equipped to perform such analysis, and the transfer of the laser measurements to external entities may not be required.

In one or more embodiments, laser measurement agent (230) is a hardware device including circuitry. Laser measurement agent (230) may be, for example, a digital signal processor, a field programmable gate array, or an application specific integrated circuit. Laser measurement agent (230) may be other types of hardware devices without departing from the invention.

In one or more embodiments, laser measurement agent (230) is implemented as computing code stored on a persistent storage (not shown) that when executed by a processor of network device (200) performs the functionality of laser measurement agent (230). The processor may be a hardware processor including circuitry such as, for example, a central processing unit or a microcontroller. The processor may be other types of hardware devices for processing digital information without departing from the invention.

In one or more embodiments, local laser measurement repository (240) stores laser measurements. As discussed above, the laser measurements may be obtained from one or more laser measurement devices (e.g., 224) of the optical transceivers (e.g., 220A, 220N) in network device (200). In one or more embodiments, the laser measurements specify values for the behavior of lasers (e.g., 222A, 222N) of each optical transceiver (e.g., 220A, 220N) in network device (200). The behavior may be represented as, for example, a voltage reading, a current reading, or a power reading of the lasers at specified points in time. The behavior may be represented as other variables without departing from the invention. The laser measurements may further specify the optical transceiver type of the corresponding optical transceiver. Further, in scenarios in which the laser measurements are indirect laser measurements, local laser measurement repository (240) may also store information that identifies the transceiver with which the laser measurements are associated. See e.g., FIG. 4B.

FIG. 3A shows a flowchart describing a method for generating a failure profile using laser measurements in accordance with one or more embodiments disclosed herein. The method of FIG. 3A may be performed by, for example, a failure profile generation manager (e.g., 112, FIG. 1) or by a laser measurement agent (e.g., 230, FIG. 2). Other components illustrated in FIGS. 1-2 may perform the method of FIG. 3A without departing from the invention. Further, one or more steps in FIG. 3A may be performed concurrently with one or more steps in FIG. 3B.

While the various steps in the flowchart shown in FIG. 3A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 302, laser measurements of a laser associated with an optical transceiver are obtained. The laser measurements may be any combination of direct or indirect laser measurements. In one or more embodiments, the laser measurements are obtained from a laser measurement agent executing on a network device. The laser measurements may specify the optical transceiver, the laser associated with the optical transceiver, and the voltage, power, current, or other characteristics of the corresponding lasers during a predetermined point in time.

In step 304, laser measurements associated with an optical transceiver type of the optical transceiver are obtained from a laser measurements repository. In one or more embodiments, the optical transceiver type is specified in the laser measurements. In one or more embodiments, the laser measurements of one optical transceiver type is identified based on the specified optical transceiver type in the laser measurements. Said another way, the failure profile generation manager, or other entity performing the method, analyzes the laser measurements to determine the optical transceiver type of the laser measurements.

After the optical transceiver type is identified, the failure profile generation manager, or other entity performing the method, may obtain additional laser measurements, if any, that are associated with the optical transceiver type and stored in a laser measurements repository. The laser measurements repository may be, for example, a laser measurements repository of the network device from which the laser measurements of step 302 were obtained. Alternatively, the laser measurements repository may be stored in the cloud service from which the failure profile generation manager, or other entity performing the method, is executing.

In step 306, a failure profile associated with the optical transceiver type is generated by implementing a machine learning algorithm on the identified laser measurements. In one or more embodiments, the machine learning algorithm includes inputting the laser measurements and whether the optical transceiver is in a failed state or risk of failure state (e.g., as determined by an administrator of the network device, or any other entity) into a machine learning model and generating a pattern of the laser behavior. If the optical transceiver was previously determined to be in a failed state or risk of failure state due to the failure of the laser, the pattern of the laser behavior is classified as a failure profile. The failure profile may be stored in a failure profile repository.

While FIG. 3A describes a method for generating a failure profile, embodiments of the invention may be implemented using failure profiles obtained from other sources, e.g., transceiver vendors. Moreover, the failure profile generation may be performed each time new laser measurement data is obtained from network devices or, alternatively, periodically (e.g., a certain amount of new data is obtained and/or after certain periods of time have elapsed).

While FIG. 3A describes the identification of a failure profile based on the optical transceiver type, the method shown in FIG. 3A may be also be performed by identifying the failure profile based on the laser type without departing from the invention.

Figure 3B:
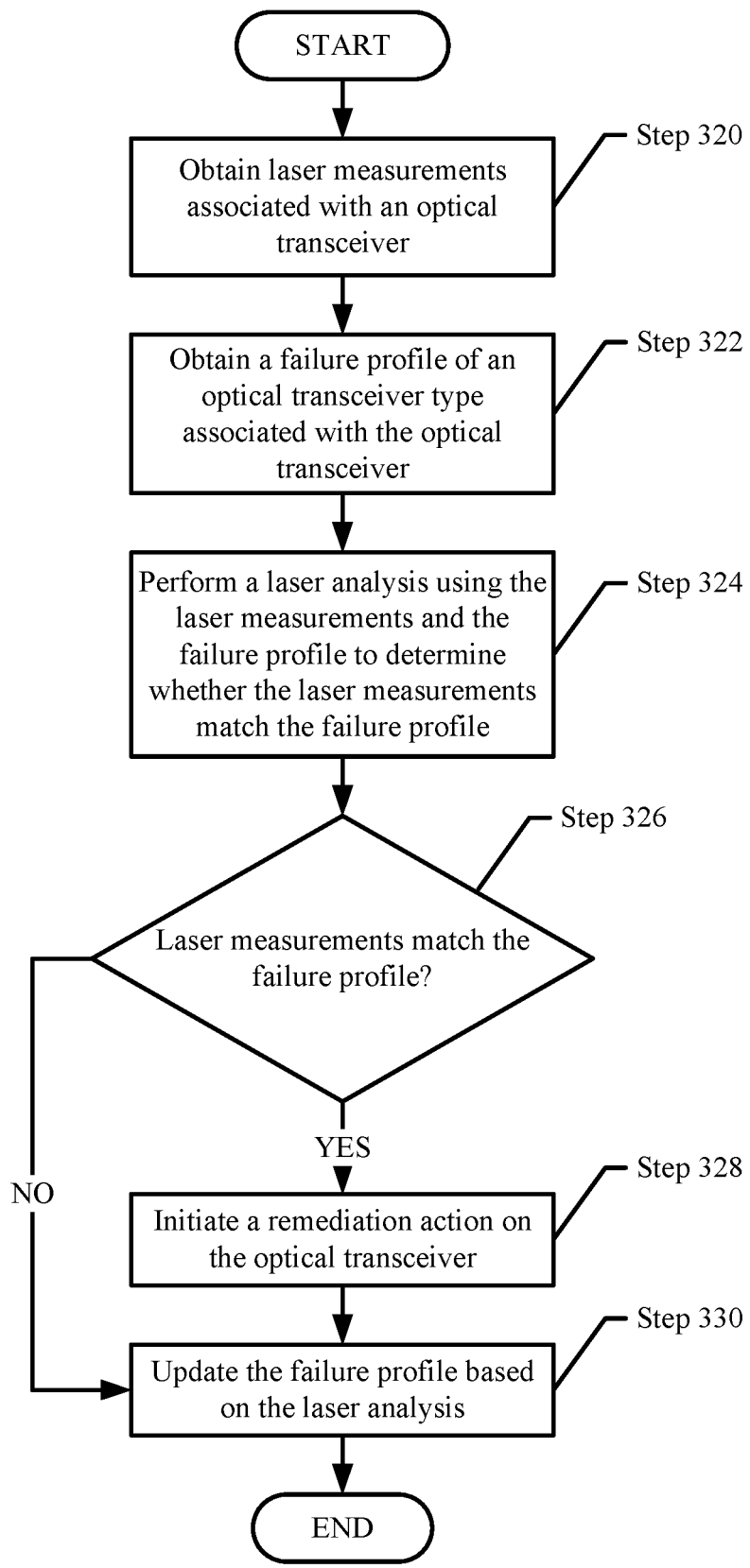
FIG. 3B shows a flowchart describing a method for monitoring optical transceivers in a network device in accordance with one or more embodiments described herein.

FIG. 3B shows a flowchart describing a method for monitoring optical transceivers in a network device in accordance with one or more embodiments disclosed herein. The method of FIG. 3B may be performed by, for example, a failure profile generation manager (e.g., 112, FIG. 1) or by a laser measurement agent (e.g., 230, FIG. 2). Other components illustrated in FIGS. 1-2 may perform the method of FIG. 3B without departing from the invention.

While the various steps in the flowchart shown in FIG. 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3B may be performed concurrently with one or more steps in FIG. 3A.

In step 320, laser measurements associated with an optical transceiver are obtained. In one or more embodiments, the laser measurements are obtained from a laser measurement agent executing on a network device. The laser measurements may specify the network device from which the measurements were received, the optical transceiver, the laser associated with the optical transceiver, and the voltage, power, current, or other characteristics of the corresponding lasers during a predetermined point in time.

In one or more embodiments of the invention, the laser measurements are obtained from an optical transceiver that monitors the behavior of a second optical transceiver (i.e., indirect laser measurements). In such embodiments, the optical transceiver sending the laser measurements may specify the optical transceiver for which the monitoring is performed. Alternatively, the laser measurements may specify a port (e.g., a receiver in the first optical transceiver) from which the laser measurements are recorded. The failure profile generation manager may use the information to identify the optical transceiver (e.g., the second optical transceiver) for which the indirect laser measurements are associated.

In one or more embodiments, the first optical transceiver sending the laser measurements has a physical connection to the second optical transceiver associated with the indirect laser measurements. The physical connection may include, for example, a fiber optic cable connecting a transceiver of the second optical transceiver to a receiver of the first optical transceiver. The network device and/or the cloud service may track the physical connectivity between the first and second optical transceivers.

In one or more embodiments, the laser measurements are associated with the optical transceiver from which the laser measurements are obtained (i.e., direct laser measurements). In such embodiments, the direct laser measurements specify the optical transceiver sending the laser measurements.

In step 322, a failure profile of an optical transceiver type associated with the optical transceiver is obtained. In one or more embodiments, the failure profile may be obtained from a failure profile repository. The failure profile may specify the optical transceiver type of the optical transceiver associated with the laser measurements. As discussed above, the laser measurements may be direct or indirect laser measurements and the laser measurements may be provided to the cloud service with additional information such as the optical transceiver type. This information may then be used to identify the failure profile.

In step 324, a laser analysis is performed using the laser measurements and the failure profile to determine whether the laser measurements match the failure profile. In one or more embodiments, the laser analysis includes converting the laser measurements into a function that is comparable to the failure profile.

For example, if the laser measurements include a series of data points of a laser's power over discrete points in time, the laser measurements may be converted via, for example, a linear regression model, to a function of laser voltage over time. The function may be compared to the failure profile which may be represented as a function of laser power over time. As a second example, if the laser measurements specify a voltage of a laser over time, and the failure profile is a representation of power over time for a laser, the laser measurements may be converted such that the laser measurements represent the power over time. In this manner, the failure profile and the laser measurements are in a standard format, and thus may be compared.

In step 326, a determination is made about whether the laser measurements match the failure profile. The determination is made based on the laser analysis. In one or more embodiments, the laser measurements may match the failure profile if the laser measurements are similar and/or relatively similar. The failure profile may be similar to the laser measurements if the deviation between the values in the respective function is minimal. A maximum amount of deviation may be allowed between the laser measurement and the failure profile for the two to be considered similar. The maximum amount of deviation may be predetermined by, for example, an administrator of the network devices. Other entities may set the maximum deviation value without departing from the invention. If the laser measurements match the failure profile, the method proceeds to step 328; otherwise, the method proceeds to step 330.

In one or more embodiments, the determination that the laser measurements match the failure profile may result in the determination that the optical transceiver is about to fail.

In step 328, a remediation action is initiated on the optical transceiver. In one or more embodiments, a remediation action is an action performed to remediate the determination that the optical transceiver is about to fail. The remediation action may include, for example, sending a notification to an administrator, or another entity. The notification may specify: (i) the network device on which the laser is located and (ii) information about which laser(s) on the network device is about to fail. The notification may further include a time period in which the laser may fail, the time period may be determined, for example, based on the failure profile and/or a machine learning model that predicts, based on the current laser measurements, when the laser is likely to fail.

In step 330, the failure profile is updated based on the laser analysis. In one or more embodiments, the failure profile is updated by using the result of the laser analysis (e.g., the determination that the laser is or is not about to fail) and the laser measurements as inputs for the machine learning algorithm of FIG. 3A. In this manner, the failure profile continues to improve in its accuracy when determining when a laser of an optical transceiver is about to fail.

While FIG. 3B describes the identification of a failure profile based on the optical transceiver type, the method shown in FIG. 3B may be also be performed by identifying the failure profile based on the laser type without departing from the invention.

Examples

Figure 4A:
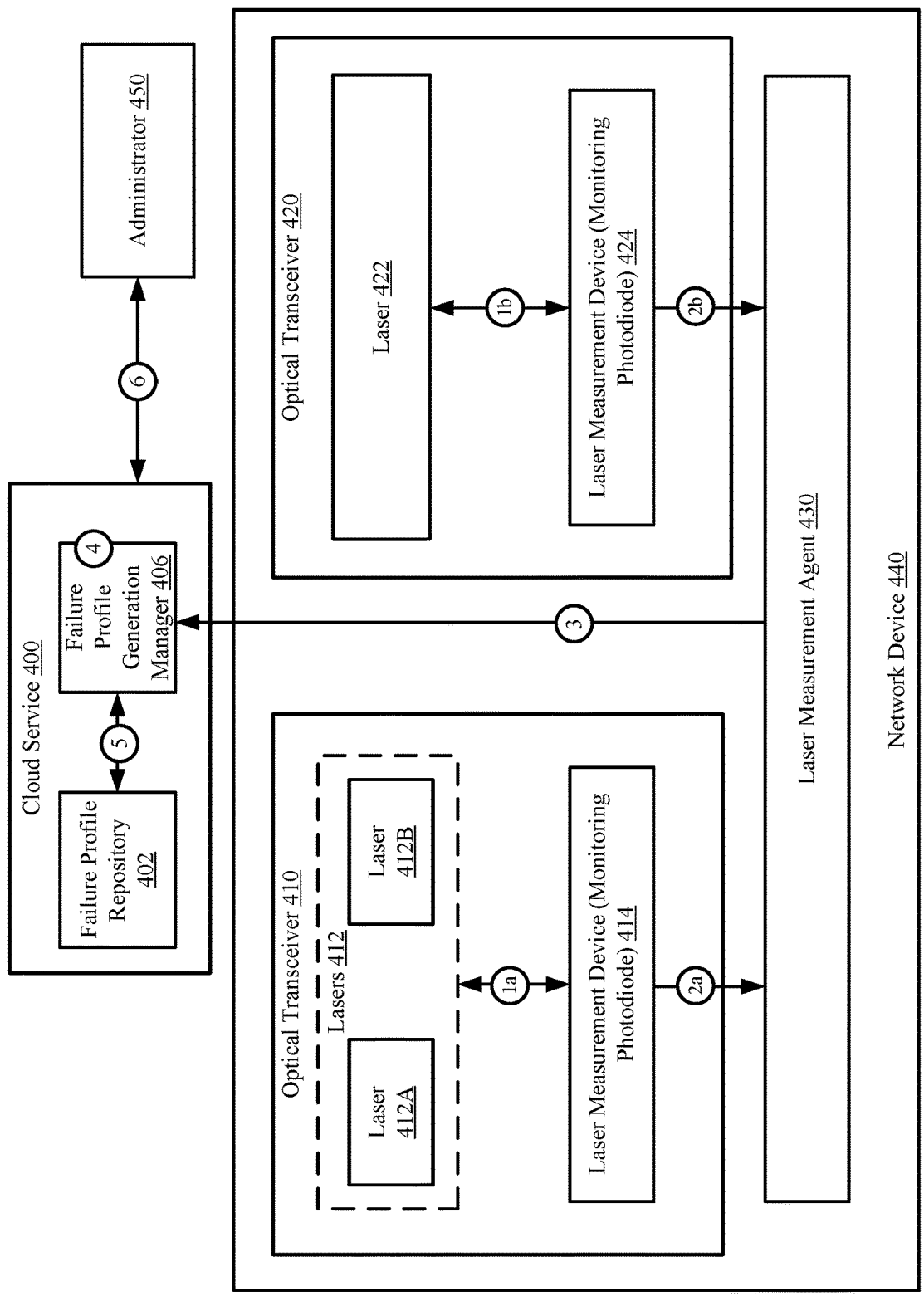
FIGS. 4A-4B shows an example in accordance with one or more embodiments described herein.
Figure 4B:
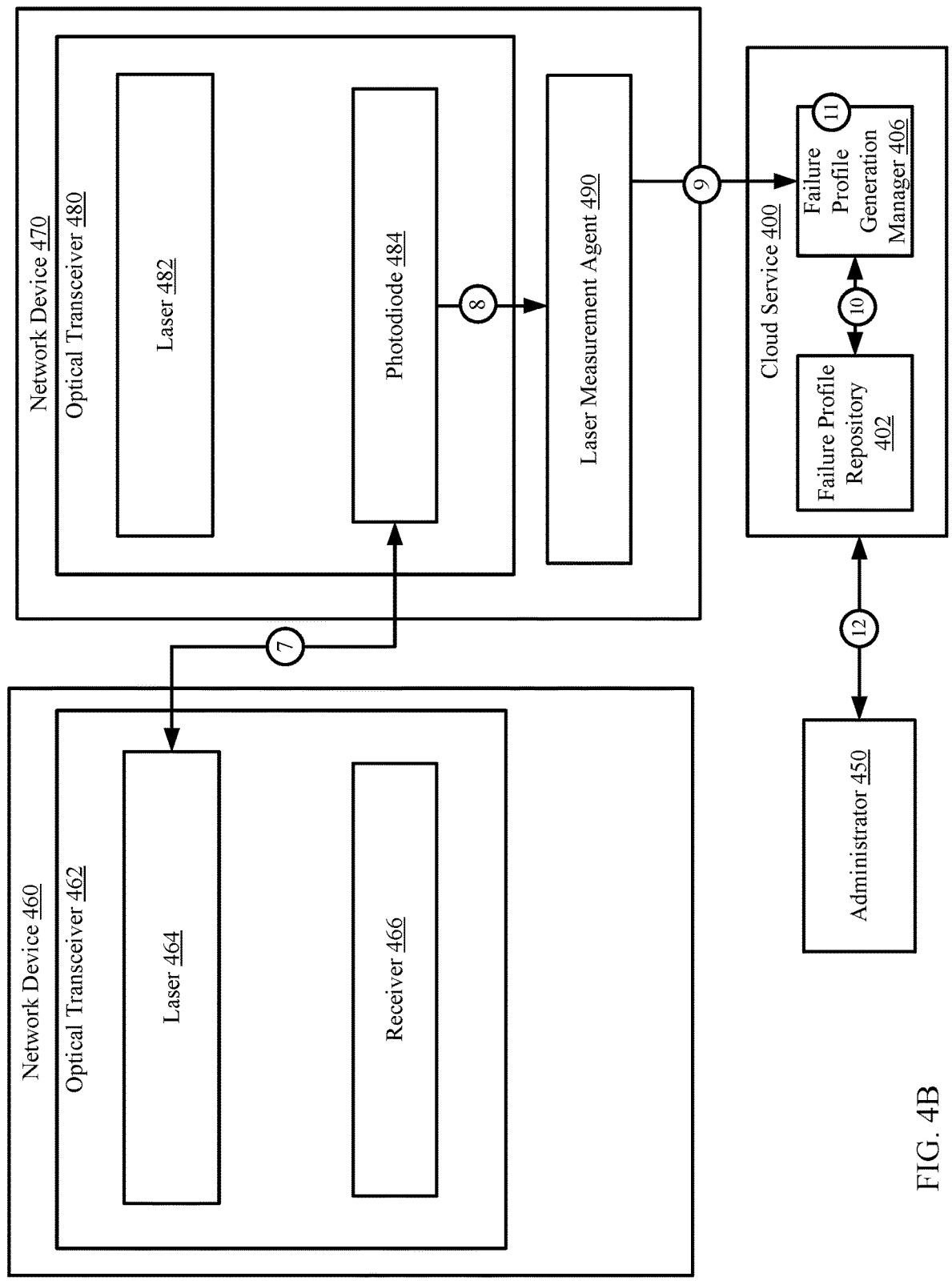

FIGS. 4A-4B shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 4A, consider a scenario in which network device (440) monitors lasers of two optical transceivers (e.g., optical transceiver (410) and optical transceiver (420)). As shown in FIG. 4A, each optical transceiver (i.e., 410, 420) includes lasers (i.e., 412, 422). Optical transceiver (410) includes laser measurement device (414) that monitors the optical power of laser (412A) and laser (412B) over a period of time [1a] (i.e., direct laser measurement). Optical transceiver (420) includes laser measurement device (424) that monitors the optical power of laser (422) over a period of time [1b] (i.e., direct laser measurement). In this example, each laser measurement device (i.e., 414, 424) is a monitoring photodiode that measures the photocurrent by converting the light energy emitting from the respective laser to an electric potential, which is measured as a current on the photodiode.

Optical transceiver (410) is of a first optical transceiver type that utilizes two lasers (e.g., 412A, 412B). In contrast, optical transceiver (420) is of a second optical transceiver type that utilizes one laser (e.g., 422). As such, two failure profiles are stored in failure profile repository (402) of cloud service (400). Each failure profile corresponds to an optical transceiver type. Each failure profile is represented as a function of voltage over time.

The laser measurements are obtained by laser measurement agent (430) [2a, 2b]. Laser measurement agent (430) sends the laser measurements to cloud service (400). Specifically, the laser measurements are obtained by failure profile generation manager (406) of cloud service (400) [3].

Failure profile generation manager (406), as a result of obtaining the laser measurements, performs a laser analysis of the lasers in accordance with FIG. 3B. Specifically, the laser analysis includes converting the voltage readings of each laser to a function of voltage over time by performing a linear regression on the voltage readings [4]. The linear regressions generated from the voltage readings are compared to the respective failure profiles [5].

Based on the laser analysis performed for each laser, it is determined that the laser measurements of laser (422) are similar to the respective laser profile. Based on the determination, cloud service (400) sends a notification to administrator (450) about the potential future failure [6].

Further, the determination, and the obtained power readings (or photocurrent on the monitoring photodiodes), are applied as inputs for the machine learning algorithm that was used to generate the respective failure profiles. In this manner, the failure profiles are updated based on the obtained laser measurements. This may improve the accuracy of the failure profiles for future laser analyses.

FIG. 4B shows a second example system. The second example system shows initial communication between two network devices (e.g., network device (460) and network device (470)). Network device (460) includes optical transceiver (462) that includes a transmitter portion (which includes a laser (464)) and receiver portion (466). Network device (470) includes optical transceiver (480) that includes a transmitter portion (which laser (882)) and a receiver portion (which includes photodiode (484)).

Network devices (460, 470) communicate via laser (464) of network device (460) sending data to be received by photodiode (484) in the receiver portion of network device (470) [7]. In this example, neither network device (460) nor network device (470) are equipped with a monitoring photodiode. As a result, photodiode (484) of network device (470) serves as the laser measurement device of optical transceiver (462).

Network device (470) further includes laser measurement agent (490). When optical transceiver (462) and optical transceiver (480) are initially physically connected, e.g., using an optical cable, network device (470) performs a calibration to obtain a baseline of laser measurements for laser (464). Thereafter, laser measurement device (484), after periodically monitoring laser (464), sends laser measurements (i.e., indirect laser measurements) to laser measurement agent (490), which specify that these laser measurements are for optical transceiver (462) [8]. The laser measurements are sent to failure profile generation manager (406) of cloud service (400) [9].

Failure profile generation manager (406), in response to obtaining the laser measurements curve, performs the method of FIG. 3B. Specifically, failure profile generation manager (406) identifies the optical transceiver (i.e., optical transceiver (462)) associated with the obtained laser measurements by identifying that optical transmitter (462) is connected to optical transmitter (480). Failure profile generation manager (406) obtains a previously-generated failure profile from a failure profile repository (402) [10] and performs a laser analysis on the laser measurement curve [11]. The result of the analysis is that the laser profile of optical transceiver (462) matches a failure profile of a similar optical transceiver type. After such determination, the cloud service (400) sends a notification to administrator (450) that specifies the potential failure of optical transceiver (462) [12].

While not shown in the example, the failure profile repository (402) is updated based on the determination made by the failure profile generation manager (406).

End of Examples

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of the components illustrated in FIG. 5 is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments described herein allow for the operation of a network device to be pre-emptively remediated in the event of a potential failure of a component in the network device. Embodiments described herein may include monitoring the network devices to enable such pre-emptive remediation. Embodiments described herein may include analyzing the results of the monitoring to determine whether such components (e.g., optical transceivers) are in potential need of replacement and to perform such actions. Further, embodiments described herein utilize machine learning to improve the accuracy of such analyses. In this manner, the amount of disruption caused by potential failure of network devices is reduced.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing optical transceiver operation, the method comprising:
    obtaining one or more laser measurements for an optical transceiver;
    obtaining a failure profile based on additional laser measurements taken over a time period for a set of optical transceivers of a given optical transceiver type that have failed or were failing during the time period; and
    initiating a remediation action for the optical transceiver based on a comparison of the obtained one or more laser measurements to the failure profile.

2. The method defined in claim 1, wherein the failure profile comprises a pattern of laser behavior generated by a machine learning algorithm using the additional laser measurements as inputs to the machine learning algorithm.

3. The method defined in claim 1, wherein initiating the remediation action for the optical transceiver occurs prior to a time at which the optical transceiver is expected to fail.

4. The method defined in claim 1, wherein initiating the remediation action for the optical transceiver is in response to a deviation of the obtained one or more laser measurements from the failure profile being less than a deviation value.

5. The method defined in claim 4, wherein initiating the remediation action for the optical transceiver comprises sending a notification indicative of a network device associated with the optical transceiver for output at an output device.

6. The method defined in claim 1,
wherein the obtained one or more laser measurements for the optical transceiver are indicative of laser behavior of the optical transceiver over time, wherein the failure profile comprises a pattern of laser behavior indicative of laser failure for the given optical transceiver type,
and wherein the comparison of the obtained one or more laser measurements to the failure profile comprises a comparison of the laser behavior of the optical transceiver over time to the pattern of laser behavior indicative of laser failure for the given optical transceiver type.

7. The method defined in claim 1, wherein the optical transceiver is of the given optical transceiver type and wherein the failure profile is specific to the given optical transceiver type.

8. The method defined in claim 1, wherein the one or more laser measurements are obtained for a laser of a given laser type in the optical transceiver and wherein the failure profile is specific to the given laser type.

9. The method defined in claim 1, wherein obtaining the failure profile comprises generating a pattern of laser behavior using the additional laser measurements for the set of optical transceivers.

10. The method defined in claim 9 further comprising:
updating the failure profile based on the one or more laser measurements for the optical transceiver and information indicative of the optical transceiver being in an at-risk-of-failure or failed state.

11. The method defined in claim 1, wherein the failure profile comprises at least one of a function of voltage over time indicative of laser failure, a function of current over time indicative of laser failure, and a function of power over time indicative of laser failure.

12. The method defined in claim 11, wherein the one or more laser measurements are each a voltage measurement, a current measurement, or a power measurement.

13. One or more non-transitory computer readable media comprising computer-executable instructions that, when executed by one or more processors for a system, cause the one or more processors to:
obtain laser measurements for one or more optical transceivers and corresponding information indicative of whether or not each of the one or more transceivers contained a laser failure;
generate a failure profile using a regression algorithm with the obtained laser measurements as inputs to the regression algorithm; and
output a notification indicating a likelihood of a given optical transceiver to experience a failure over a future time period based on a comparison of additional laser measurements for the given optical transceiver to the failure profile.

14. The one or more non-transitory computer readable media defined in claim 13 further comprising computer-executable instructions that, when executed by the one or more processors, cause the one or more processors to:
make a determination on whether a laser behavior indicated by the additional laser measurements for the given optical transceiver matches the failure profile.

15. The one or more non-transitory computer readable media defined in claim 14, wherein the computer-executable instructions that cause the one or more processors to output the notification indicating the likelihood of the given optical transceiver to experience the failure over the future time period comprise
computer-executable instructions that, when executed by the one or more processors, cause the one or more processors to
output the notification indicating the given optical transceiver is likely to experience the failure over the future time period in response to the determination indicating a match between the laser behavior and the failure profile.

16. The one or more non-transitory computer readable media defined in claim 14, wherein the computer-executable instructions that cause the one or more processors to make the determination comprise
computer-executable instructions that, when executed by the one or more processors for the system, cause the one or more processors to
determine that the laser behavior deviates from the failure profile by less than an allowable deviation.

17. The one or more non-transitory computer readable media defined in claim 13, wherein the given optical transceiver is different from the one or more optical transceivers for which the laser measurements are obtained and is of a same optical transceiver type as the one or more optical transceivers.

18. The one or more non-transitory computer readable media defined in claim 13, wherein the given optical transceiver is one of the one or more optical transceivers for which the laser measurements are obtained.

19. A method for managing optical transceiver operation, the method comprising:
obtaining a failure profile based on a first laser measurement for a first laser in a first optical transceiver;
obtaining a second laser measurement for a second laser in a second optical transceiver;
initiating a remediation action for the second optical transceiver based on the failure profile and the second laser measurement; and
obtaining an updated failure profile by updating the failure profile using the second laser measurement for the second laser.

20. The method defined in claim 19, wherein the failure profile comprises laser behavior over time indicative of laser failure.

* * * * *